United States Patent
Latham et al.

[11] 3,982,863
[45] Sept. 28, 1976

[54] QUENCHING OF POLYMERIC FILM

[75] Inventors: Raymond John Latham, Stoke-on-Trent; Arthur John Holloway, Hertford, both of England

[73] Assignee: Imperial Chemical Industries Limited, London, England

[22] Filed: Aug. 19, 1974

[21] Appl. No.: 498,852

Related U.S. Application Data

[63] Continuation-in-part of Ser. No. 358,346, May 8, 1973, abandoned.

[30] Foreign Application Priority Data

May 12, 1972 United Kingdom............. 22341/72

[52] U.S. Cl.............................. 425/135; 264/22; 264/40.7; 425/174.8 E; 425/377
[51] Int. Cl.²........................................ B29D 7/22
[58] Field of Search................. 226/94; 264/22, 24, 264/40, 216, 26; 425/174.8 E, 135, 140, 141; 317/262 E; 425/8

[56] References Cited
UNITED STATES PATENTS

| | | | |
|---|---|---|---|
| 3,212,461 | 10/1965 | Fritzberg | 425/377 X |
| 3,323,887 | 6/1967 | Downey | 425/8 X |
| 3,341,888 | 9/1967 | Bridge et al. | 425/377 X |
| 3,758,251 | 9/1973 | Gillyns et al. | 425/174.8 E |

Primary Examiner—Francis S. Husar
Assistant Examiner—Mark Rosenbaum
Attorney, Agent, or Firm—Cushman, Darby & Cushman

[57] ABSTRACT

In the electrostatic pinning of molten polymeric film, especially polyethylene terephthalate film, to a quenching drum, the insulators for those parts of the pinning electrode positioned outside the edges of the film are adjusted to follow the transverse fluctuations which may occur in the film edges so as to prevent sparking between the electrode and the margins of the quenching drum outside the film edges.

5 Claims, 3 Drawing Figures

QUENCHING OF POLYMERIC FILM

This application is a continuation-in-part of our application Ser. No. 358,346 filed on May 8, 1973, now abandoned.

The present invention relates to apparatus for quenching an extruded polymeric film.

Polymeric film is commonly made by extrusion from a slot die on to a rotating casting drum where it is solidified into a form suitable for subsequent film making operations. In the case of certain crystallisable polymeric materials, such as polyethylene terephthalate, it is important to rapidly quench the extruded film to a temperature below its second order glass transition temperature to minimise the onset of excessive crystallinity in the film which would cause embrittlement and interfere with subsequent film making operations. Quenching may be effected by extruding the film on to a suitably cooled casting drum. One method of obtaining good contact between the film and the casting drum surface and preventing the film from slipping on the drum surface is known as electrostatic pinning and involves depositing electrostatic charges upon the molten film before it reaches the casting drum and usually electrically earthing the casting drum. Such an electrostatic pinning system is shown in U.S. Pat. No. 3,223,757 which is incorporated herein by reference.

The electrostatic charges are normally applied to the film by a pinning electrode, which may be in the form of a wire, extending transversely across the film and located just clear of the film surface so that electrostatic charges are deposited on the film just before it makes contact with the drum surface. Generally the film is narrower than the casting drum so that a margin of the drum surface remains exposed beyond each edge of the deposited film. In view of the proximity of the pinning electrode to the casting drum surface there is a risk that sparking will develop between the electrode and the exposed margins of the drum surface thereby diminishing the pinning effect and impairing the quenching of the extruded film. It has been proposed to insulate the ends of the pinning electrode against such sparking as shown in U.S. Pat. No. 3,571,853.

The molten film tends to neck-in between the extrusion die and the casting drum and the degree of neck-in can vary throughout the process of making film, for example if a change of film thickness is made during a process run. It has been found that sparking can occur from the uninsulated ends of the electrode which are exposed above the casting drum as the edges of the film neck-in. This invention provides a means of moving the pinning electrode insulators to compensate for fluctuations in the film width.

According to the present invention an apparatus for electrostatically pinning a molten polymeric film to an electrically earthed casting surface comprises a pinning wire electrode extending transversely across the casting surface and connected to a high voltage electrical source, the pinning wire electrode being supported in spaced relation from the molten film for the deposition of electrostatic charges upon the film in the proximity of or prior to the region of first contact of the film and the casting surface, and being electrically insulated by dielectric insulators located beyond the film edges, said dielectric insulators being movable along the wire electrode by an amount corresponding to any transverse fluctuations that may occur in the film edges by means which are activated by a sensor of the transverse fluctuations of the film edges whereby sparking between the wire electrode and the margins of the casting surface is impeded.

It will be understood that this invention is equally useful for compensating for the inward or outward movement of the film edges and provides an efficient way of moving the wire insulators which would otherwise need to be accomplished by a difficult and hazardous manual adjustment.

The present invention may be used for the quenching of all polymeric materials which are capable of being formed into a flat film and being quenched, such as polycarbonates, polyamides e.g. polyhexamethylene adipamide and polycaprolactam, polyimides, polysulphones, polymers and copolymers of alpha olefines e.g. ethylene, propylene, butene and 4-methyl pentene-1, polymers and copolymers of vinyl monomers, e.g. vinyl chloride, linear polyesters and copolyesters e.g. polyethylene terephthalate, polyethylene-2,6-naphthalate, and polyethylene-1,5-naphthalate and polyesterethers e.g. polyethylene-1,2-diphenoxyethane-4,4'-dicarboxylate. The present invention is particularly suitable for use in the production of polyethylene terephthalate film.

The invention is also concerned with a process of casting a molten polymeric film upon an electrically earthed casting surface which comprises passing the film past a pinning wire electrode which extends transversely across the casting surface and is connected to a high voltage electrical source, the pinning wire being supported in spaced relation from the molten film, depositing electrostatic charges upon the molten film from the pinning wire electrode in the proximity of or prior to the region of first contact of the film and the casting surface, the pinning wire electrode being electrically insulated by dielectric insulators located beyond the film edges, and moving the dielectric insulators along the wire electrode by an amount corresponding to any transverse fluctuations that may occur in the film edge in response to said edge fluctuations whereby sparking between the wire electrode and the margins of the casting surface is impeded.

The casting surface may take any convenient form such as a rotating drum having a highly polished surface from which the film may be readily stripped and which may be cooled by the passage of a quenching fluid or a continuous moving band of metal.

The dielectric insulators may conveniently take the form of tubular members through which the wire electrode passes and which conform approximately to the outer dimension of the wire electrode but are a loose enough fit to enable the insulators to be moved along the wire electrode to compensate for film width variation. Any suitable dielectric material may be used to make the insulators although a fluorocarbon polymer, such as polytetrafluoroethylene, is preferred on account of its low coefficient of friction which enables it to slide along the wire electrode and also its exceptional dielectric properties. Polytetrafluoroethylene is commercially available under the trade name 'Fluon.'

The dielectric insulators may be mounted on carriers which may be moved along guides by the appropriate amount to compensate for film width variation. The carriers may be provided with a rack which engages a driven toothed wheel, conveniently powered by an electric motor.

The fluctuations of the film edges may be sensed by any convenient means such as a mechanical sensing element or optically by a photoelectric device at a location downstream of the casting surface and after the film has been stripped from the surface. The response of the edge sensing device may be converted into an electric signal which is then used to control the operation of the drive to the dielectric insulators so that the insulators are moved the requisite distance to compensate for film edge fluctuations.

It is normal practice in some film manufacturing processes, such as those used for the production of polyethylene terephthalate films, to operate the film forming extruder under constant conditions, e.g. constant polymer melt temperature and constant output, when the film producing equipment has been adjusted to steady continuous running conditions. At times it is desirable to change the thickness of the film produced during a production run and this can be accomplished by modifying the linear speed of the film through the film forming apparatus without any need to adjust the conditions of extrusion. For example, if it is desired to halve the thickness of the film, this may be achieved by doubling the speed of the film through the apparatus. In such circumstances, i.e. under constant extrusion conditions, a change in film speed will produce transverse edge fluctuations. These fluctuations are directly proportional to changes in the film speed, a fact which may be employed in another embodiment of the invention in determining the movement of the insulators. The movement of the insulators may be controlled by monitoring the speed of the film. This may be accomplished by coupling a potentiometer to the film quenching apparatus, e.g. to the drive for the casting drum, so as to produce a reference voltage representing the film speed. A second potentiometer may be coupled to the drive for the insulator carriers to produce a reference voltage representing the distance by which the insulator carriers have been advanced along their guides. Comparison of the two reference voltages provides an electrical signal which controls the electric motors coupled to the insulator carriers and hence the movement of the insulators themselves. When the reference voltages are balanced the insulators are correctly positioned with respect to the film edges and no further movement of the insulators is required until further edge fluctuation occurs.

As volatile materials which may emerge from the molten film may tend to condense upon the relatively cool surface of the wire electrode thereby impairing the electrostatic discharge and possibly also corroding the pinning wire, it is desirable to prevent or impede the contamination of the electrode surface by the condensation of the volatile materials. This may be achieved by heating the wire electrode to a temperature above the condensation temperature by electrical means or by impinging a hot gaseous blast upon the wire electrode. A useful advantage of using a gaseous blast is that the gaseous stream also tends to disperse the volatile materials away from the vicinity of the wire electrode. As a modification the hot gaseous blast may be directed between the wire electrode and the molten film to prevent volatile material reaching the wire electrode. Alternatively a supply of clean wire may be fed across the casting surface or a continuous wire may be passed across the casting surface and around a pulley on each side of the casting surface and passed through a cleaning bath or between one or more scrapers or wipers to remove any condensed deposit.

The cast film may subsequently be subjected to any conventional film forming operations known in the art, such as stretching in one or more directions to molecularly orient the film, heat setting and coating.

In order that the invention may be more readily understood it is described below in greater detail with reference to the accompanying drawings, in which.

Figure 1:
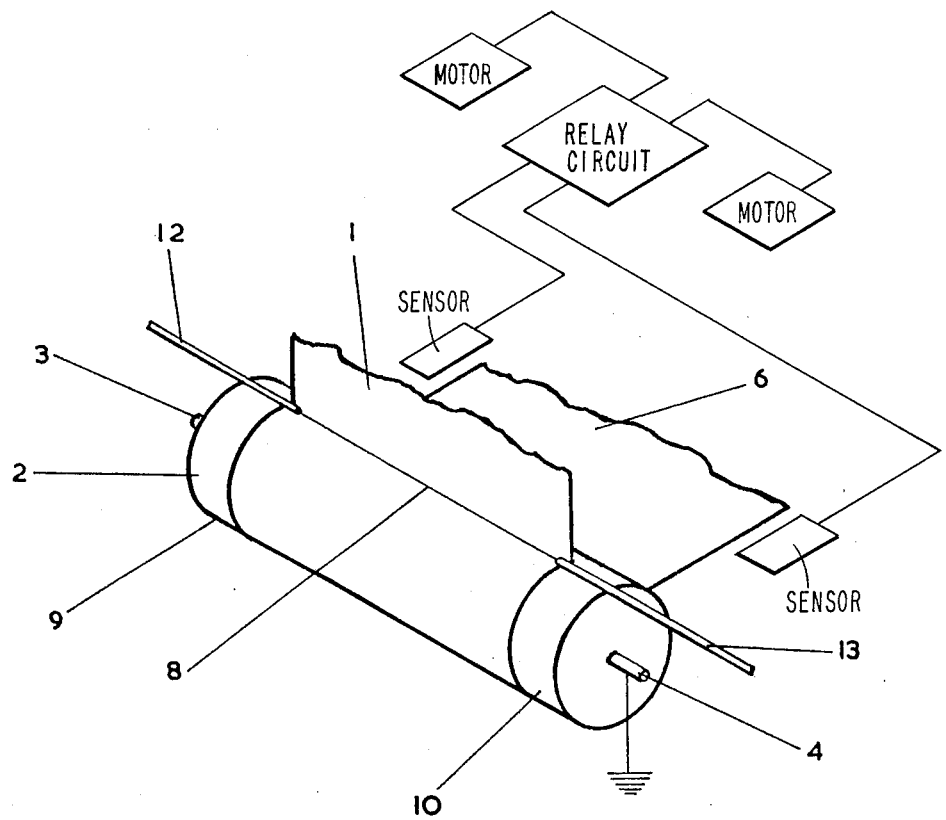
FIG. 1 is a perspective view of a web of molten film being cast on to a rotating casting drum surface.

FIG. 1 illustrates the casting of a molten polyethylene terephthalate film web 1 on to a rotating polished steel casting drum surface 2 which is cooled to a temperature below 80°C by the passage of a quenching fluid through the inlet 3 and outlet 4 which are coincident with the axis about which the drum rotates. The quenched film 6 is removed from the drum surface 2 over a roll (obscured in FIG. 1 by the drum) and is passed to a conventional molecular orienting and heat setting unit (not illustrated).

A pinning wire electrode 8 is supported in tension close to the film surface in the proximity of but before the touch down region of the molten film web on to the casting drum surface. The wire electrode 8 is made from a nickel-chrome alloy and has a diameter of approximately 0.007 inch, a specific resistance of 72 microhms per $cm^3$ and a measured resistance of between 30 and 35 ohms depending upon the operating temperature of the electrode.

The pinning wire electrode 8 is connected to a high voltage generator (not shown in FIG. 1) which applies a potential of 4.5 kv and a current of 720 micro amp to the electrode. Electrostatic charges are deposited by the wire electrode 8 upon the molten film 1 and attract the film to the surface 2 of the casting drum which is maintained at earth potential.

The molten film web 1 is narrower than the casting drum surface 2 such that bare margins 9 and 10 of the steel casting drum surface are exposed beneath the pinning wire. Accordingly the end sections of the pinning wire 8 which are located above these exposed margins 9 and 10 are insulated with polytetrafluoroethylene tubing insulators 12 and 13 which just overlap the edges of the molten film web 1 and may be moved along the wire electrode 8 to accommodate fluctuations in the film edges.

Figure 2:
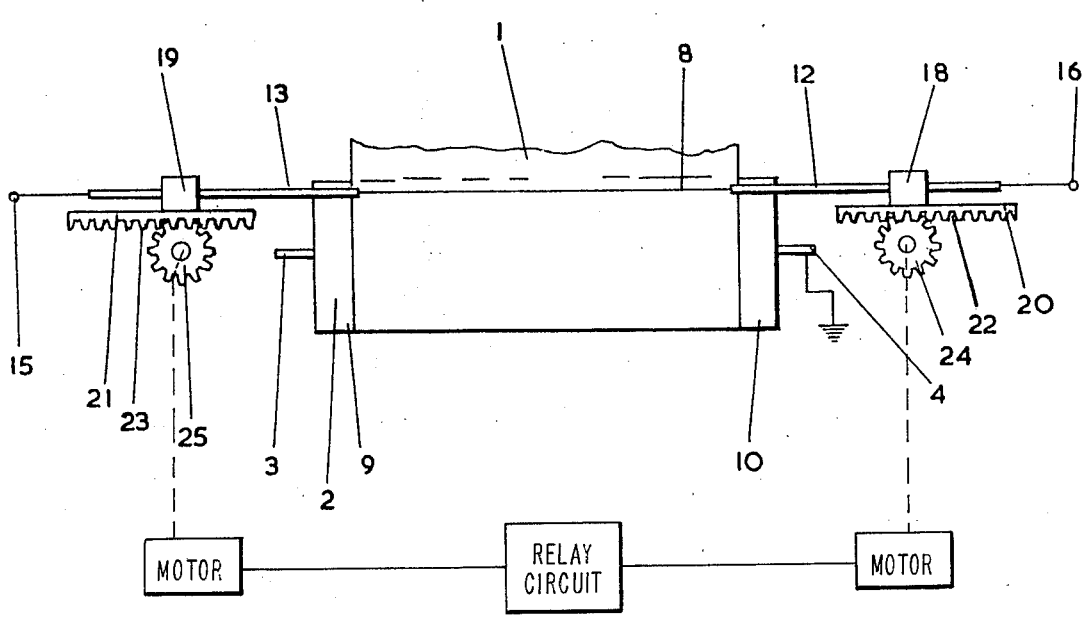
FIG. 2 is an elevational view of one embodiment of the invention.

FIG. 2 illustrates one form of mechanism which may be employed to move the insulators 12 and 13 shown in FIG. 1. For simplicity the framework supporting the components of the apparatus has been omitted from FIG. 2. Components common to FIGS. 1 and 2 are identified by like reference numerals. The pinning wire 8 is maintained under slight tension between two fixed points 15 and 16, the latter being connected to the high voltage generator (not shown). The tubular insulators 12 and 13 are gripped firmly by clamps 18 and 19 respectively which are made from a dielectric material such as a reinforced urea or phenol formaldehyde resin and are mounted on carriers 20 and 21 respectively. These carriers 20 and 21 are each located in a fixed channel (not shown) extending parallel to the wire electrode 8 along which they are freely movable. The carriers 20 and 21 are each provided with a toothed rack 22 and 23 respectively engaging a driven toothed wheel 24 and 25 respectively. The driven wheels 24 and 25 are powered by electric motors (not shown). The operation of the electric motors is controlled by an electrical relay circuit connected to edge sensors located downstream of the casting drum which bear against the edges of the film and monitor the edge fluctuations. The relay circuit serves to actuate the electric motors thereby moving the carriers 20 and 21 along their appropriate guide channels so that the tubular insulators 12 and 13 are moved by a distance corresponding to the movement of the film edges and in the direction of the film edge movement. Accordingly, the movement of the tubular insulators 12 and 13 is synchronised with the film edge movement so that the ends of the insulators remain in slight overlapping relationship with the film edges. Hence by adjusting the position of the tubular insulators 12 and 13 sparking between the wire electrode 8 and the bare margins 9 and 10 of the casting drum is avoided.

In a modification of the above, in which the extrusion conditions for the production of the molten film web, e.g. melt temperature and extruder output, are kept constant, the movement of the insulators 12 and 13 is controlled by the comparison of output signals derived from potentiometers coupled to the drive for the casting drum 2 and the drive for the carriers 20 and 21. A potentiometer geared to the drive for the casting drum 2 produces a reference voltage which represents the linear speed of the film. Another potentiometer is geared to the drive for the toothed wheels 24 and 25 to produce a reference voltage representing the extent to which the wheels 24 and 25 have been rotated to move the carriers 20 and 21 and hence the insulators 12 and 13. A signal produced by comparison of the reference voltages from the potentiometers is used to control the operation of the electric motors driving the toothed wheels 24 and 25 so that the insulators 12 and 13 are made to follow the fluctuations in the film edges. When the reference voltages are out of balance the signal produced by comparison causes the drive motors to adjust the position of the insulators 12 and 13 until the reference voltages are brought back into balance. The insulators 12 and 13 are correctly positioned in relation to the film edges when the balanced condition is achieved and no further movement of the insulators 12 and 13 is required until further fluctuations in the film edges occur.

Figure 3:
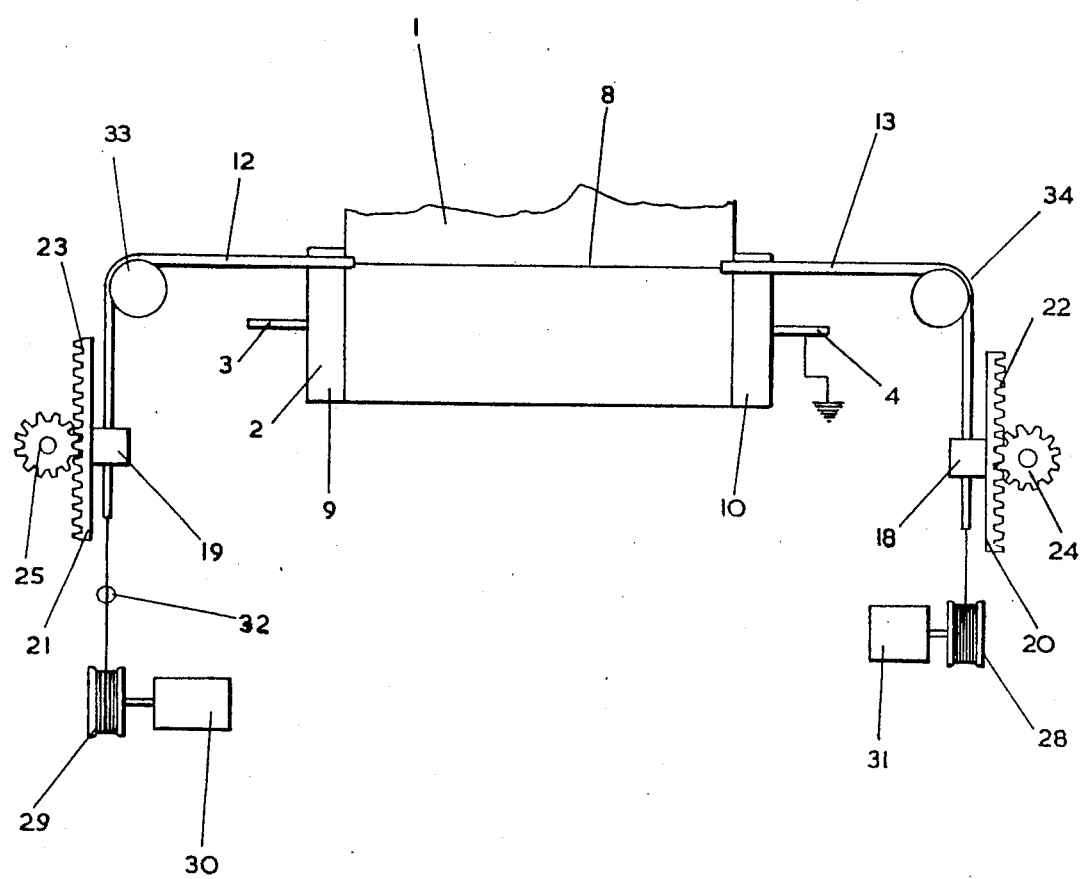
FIG. 3 is an elevational view of another embodiment of the invention.

FIG. 3 illustrates another embodiment of the invention and the components which are common to FIGS. 1, 2 and 3 are allocated the same reference numerals. The framework upon which the components of the apparatus are mounted is omitted from FIG. 3 for the sake of clarity.

The apparatus shown in FIG. 3 employs a wire electrode 8 which is drawn from a supply of clean wire wound on reel 28, traversed across the casting drum 2 and wound on to a take-up reel 29 driven by means of an electric motor 30 thereby avoiding the disadvantages of wire contamination which would otherwise occur by the condensation of volatile material upon a static wire electrode. The movement and tension of the wire electrode is governed by a torque limiter 31. The wire electrode is energised by drawing the wire across a terminal 32 of the high voltage generator adjacent the take-up reel 29.

In order to accurately position the wire electrode 8 in spaced relation from molten film web 1 and the casting drum surface 2 it is passed around guide pulleys 33 and 34 which are made of dielectric material such as a urea or phenol formaldehyde resin together with the tubular insulators 12 and 13 through which it is threaded.

The clamps 18 and 19, the carriers 20 and 21 and their racks 22 and 23 and the toothed wheels 24 and 25 are essentially similar to the corresponding components shown in FIG. 2 and operate in a similar manner to move the tubular insulators 12 and 13 in response to fluctuations in the film edges to ensure that the insulators 12 and 13 are positioned to prevent sparking between the wire electrode 8 and the exposed margins 9 and 10 of the casting drum 2. The movement of the carriers 20 and 21 is achieved in a similar manner to that used for the embodiment shown in FIG. 2, either by means of edge sensors or by potentiometerically relating the edge fluctuations, and hence the adjustment of the dielectric insulators to the linear speed of the film, the latter being carried out when constant extrusion conditions are used for the production of the molten film web.

We claim:

1. In an apparatus for electrostatically pinning a molten polymeric film to an electrically earthed casting surface which comprises a pinning wire electrode extending transversely across the casting surface and connected to a high voltage electrical source, the pinning wire electrode being supported in spaced relation from the molten film for the deposition of electrostatic charges upon the film in the proximity of or prior to the region of first contact of the film and the casting surface, and being electrically insulated by dielectric insulators located beyond the film edges, the improvement wherein the dielectric insulators are movable along the wire electrode by an amount corresponding to any transverse fluctuations that may occur in the film edges by means which are activated by a sensor of the transverse fluctuations of the film edges whereby sparking between the wire electrode and the margins of the casting surface is impeded.

2. An apparatus according to claim 1, in which the insulators are mounted on carriers which are movable along guides in response to transverse fluctuations of the film edges.

3. An apparatus according to claim 1, in which the sensor of the transverse fluctuations of the film comprises optical means or sensing elements which bear upon the edges of the film.

4. An apparatus according to claim 1, in which the sensor of the transverse fluctuations of the film comprises means for monitoring the speed of the film, wherein extrusion means are provided for the production of the molten film and operate during production at constant extrusion conditions, and said means for moving said insulators are operatively connected with said monitoring means so that said moving means are activated to move the insulators by variation in the speed of said film.

5. In an apparatus for electrostatically pinning a molten polymeric film to an electrically earthed casting surface which comprises a pinning wire electrode extending transversely across the casting surface and connected to a high voltage electrical source, the pinning wire electrode being supported in spaced relation from the molten film for the deposition of electrostatic charges upon the film in the proximity of or prior to the region of first contact of the film and the casting surface, and being electrically insulated by dielectric insulators located beyond the film edges, the improvement wherein the dielectric insulators are moved along the wire electrode by an amount corresponding to any transverse fluctuations that may occur in the film edges by means which are activated by a sensor of the transverse fluctuations of the film edges whereby sparking between the wire electrode and the margins of the casting surface is impeded, the sensor of the transverse fluctuations of the film comprises means for monitoring the speed of the film, wherein extrusion means are provided for the production of the molten film and operate during production at constant extrusion conditions and the means for monitoring the speed of the film comprises a potentiometer coupled to the drive for the casting surface, the potentiometer being arranged to produce a reference voltage representing the film speed, and a second potentiometer is coupled to the drive for the insulators and is arranged to produce a second reference voltage representing the movement of the insulators for comparison with the reference voltage representing the film speed, the insulators being movable in relation to the comparison of the reference voltages.

* * * * *